US011430165B2

(12) United States Patent
Kawachi et al.

(10) Patent No.: US 11,430,165 B2
(45) Date of Patent: Aug. 30, 2022

(54) DISPLAY CONTROL APPARATUS AND DISPLAY CONTROL METHOD

(71) Applicant: CANON KABUSHIKI KAISHA, Tokyo (JP)

(72) Inventors: Shuhei Kawachi, Tokyo (JP); Masahiko Okuzawa, Kamakura (JP); Shigeo Ajiro, Fukaya (JP); Yuki Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 116 days.

(21) Appl. No.: 16/536,713

(22) Filed: Aug. 9, 2019

(65) Prior Publication Data
US 2020/0066017 A1 Feb. 27, 2020

(30) Foreign Application Priority Data

Aug. 27, 2018 (JP) .............................. JP2018-158569

(51) Int. Cl.
*G06T 11/60* (2006.01)
*G06F 16/487* (2019.01)
(Continued)

(52) U.S. Cl.
CPC ............ *G06T 11/60* (2013.01); *G06F 16/487* (2019.01); *G06T 7/70* (2017.01); *G06T 7/97* (2017.01); *G09B 29/106* (2013.01)

(58) Field of Classification Search
CPC .. G06F 16/487; G06F 3/0482; G06F 3/04845; G06F 3/04883; G06T 11/60;
(Continued)

(56) References Cited

U.S. PATENT DOCUMENTS 9,294,678 B2 * 3/2016 Takahashi ........ H04N 5/232127
9,696,869 B2 * 7/2017 Jin ..................... G06F 3/04817
(Continued)

FOREIGN PATENT DOCUMENTS

CN 103002121 A 3/2013
CN 104285203 A 1/2015
(Continued)

OTHER PUBLICATIONS

Sep. 16, 2021 Chinese Official Action in Chinese Patent Appln. No. 201910796889.1.
(Continued)

*Primary Examiner* — Bobbak Safaipour
(74) *Attorney, Agent, or Firm* — Venable LLP

(57) ABSTRACT

A display control apparatus displays, when a map image is to be displayed on a display unit, together with the map image, information corresponding to a plurality of images associated with position information that indicates positions included in a predetermined range within a display range of the map image, and when a predetermined operation with respect to the image has been accepted through an operation unit, the control unit performs control to display an image corresponding to a relationship between a direction based on a first operation position and a second operation position of the predetermined operation and direction information associated with the plurality of images.

18 Claims, 14 Drawing Sheets

(51) Int. Cl.
*G06T 7/70* (2017.01)
*G06T 7/00* (2017.01)
*G09B 29/10* (2006.01)

(58) Field of Classification Search
CPC .......... G06T 7/70; G06T 7/97; G09B 29/007; G09B 29/106
See application file for complete search history.

(56) References Cited

U.S. PATENT DOCUMENTS

| | | | | |
|---|---|---|---|---|
| 10,627,990 | B2* | 4/2020 | Suzuki | G06F 3/0488 |
| 10,755,604 | B2 | 8/2020 | Miyazawa et al. | |
| 10,901,681 | B1* | 1/2021 | Gardes | G06F 3/04842 |
| 2009/0024314 | A1* | 1/2009 | Kim | G01C 21/367 |
| | | | | 701/532 |
| 2009/0037101 | A1* | 2/2009 | Koike | G01C 21/3682 |
| | | | | 701/533 |
| 2011/0025873 | A1* | 2/2011 | Wang | H04N 5/232935 |
| | | | | 348/222.1 |
| 2011/0074714 | A1* | 3/2011 | Ogawa | G06F 3/0485 |
| | | | | 345/173 |
| 2012/0162249 | A1* | 6/2012 | Tsuda | G06T 11/00 |
| | | | | 345/629 |
| 2013/0063384 | A1* | 3/2013 | Ito | G06F 3/0485 |
| | | | | 345/173 |
| 2015/0106761 | A1* | 4/2015 | Moriya | G06F 3/0481 |
| | | | | 715/784 |
| 2015/0377643 | A1* | 12/2015 | Arokiaraj | G06F 3/0482 |
| | | | | 701/431 |
| 2016/0148417 | A1* | 5/2016 | Kim | G06T 19/006 |
| | | | | 345/419 |
| 2016/0357415 | A1* | 12/2016 | Bovet | G06F 3/0416 |
| 2018/0101351 | A1* | 4/2018 | Kumon | G01C 21/3664 |
| 2019/0128692 | A1* | 5/2019 | Ueda | G09G 5/00 |
| 2019/0312985 | A1* | 10/2019 | Yeap | G06T 7/74 |
| 2020/0012857 | A1* | 1/2020 | Jiang | G06K 9/00671 |

FOREIGN PATENT DOCUMENTS

| | | |
|---|---|---|
| JP | 2001-289650 A | 10/2001 |
| JP | 2007-129407 A | 5/2007 |

OTHER PUBLICATIONS

Mar. 3, 2021 Chinese Official Action in Chinese Patent Appln. No. 201910796889.1.

* cited by examiner

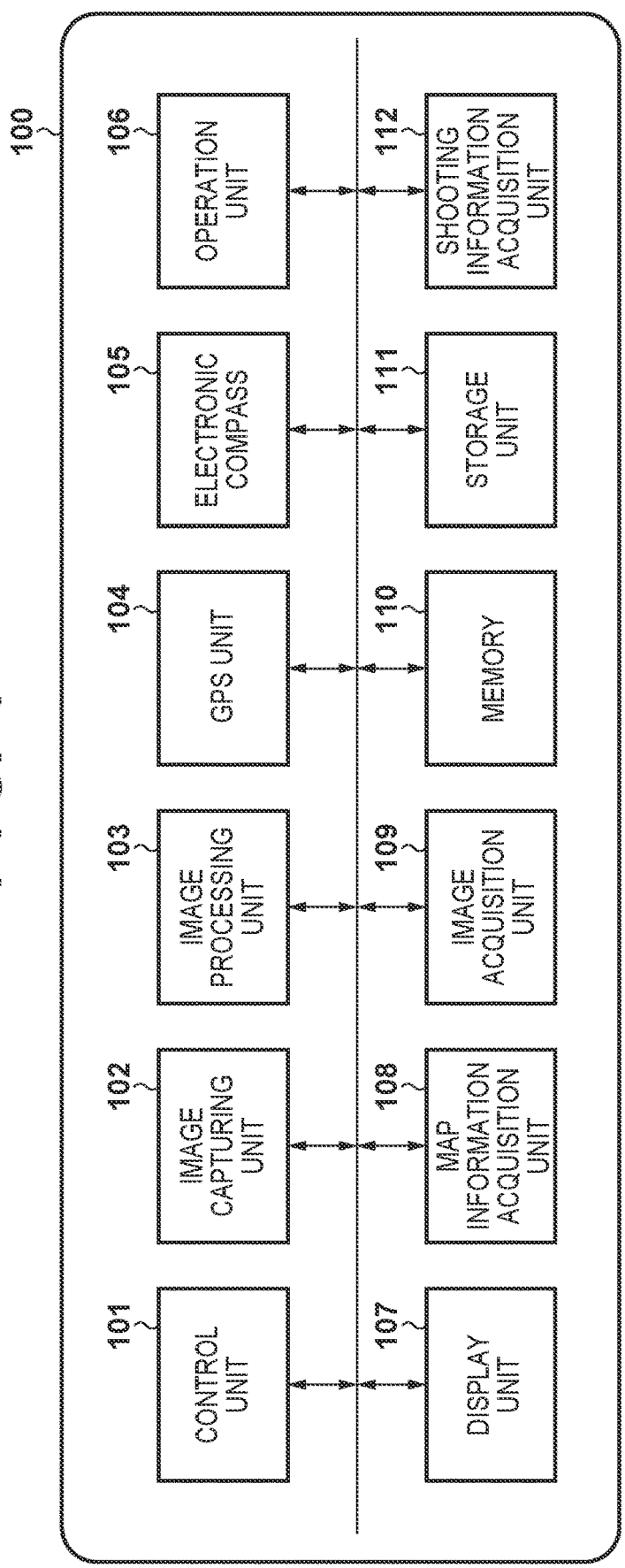

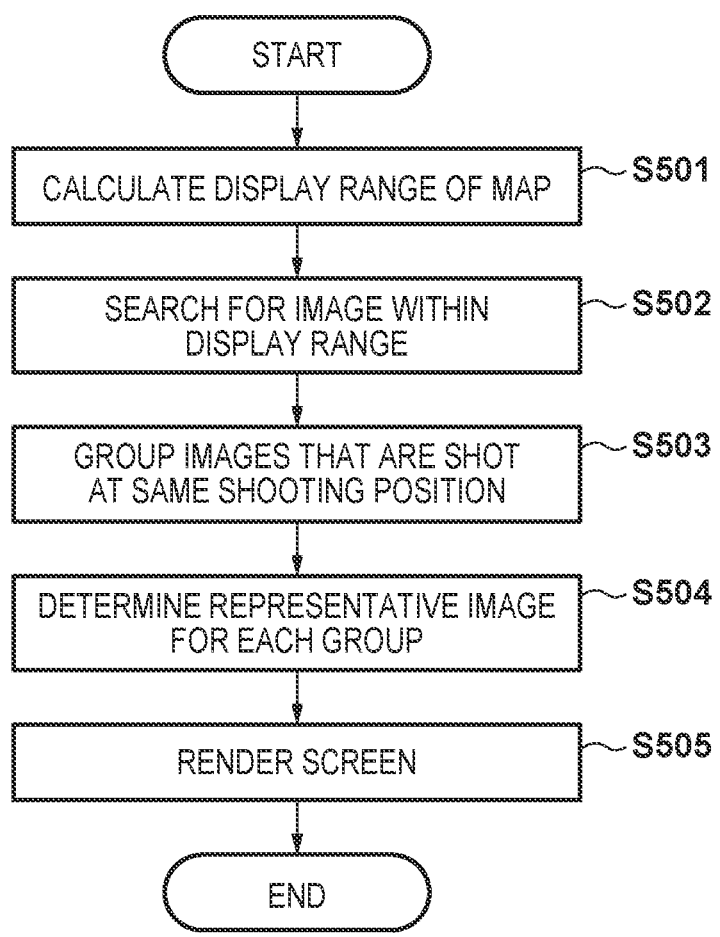

DISPLAY CONTROL APPARATUS AND DISPLAY CONTROL METHOD

BACKGROUND OF THE INVENTION

Field of the Invention

The present invention relates to a display control technique to display a shot image at a shooting position on a map image.

Description of the Related Art

Some image capturing apparatuses, such as digital cameras, are equipped with a GPS (Global Positioning System) function and an electronic compass, and are capable of acquiring information of a shooting position and a shooting direction. Furthermore, there are techniques to search for an image that was shot (a shot image) within a display range of a map image using information of a shooting position and a shooting direction, and to display the shot image at the shooting position on the map image. With use of such techniques, a user can view the shot image through an intuitive operation of designating a desired location on a map; however, when there are a plurality of shot images at the same shooting position on the map image, it is difficult to arrange the shot images on the map image.

In view of this problem, Japanese Patent Laid-Open No. 2001-289650 discloses techniques with which a plurality of shot images are displayed collectively as one icon on a map image, and by selecting the icon a list of shot images corresponding to the selected icon can be displayed. Furthermore, Japanese Patent Laid-Open No. 2007-129407 discloses techniques with which an icon having directionality conforming to a shooting direction is displayed at a shooting position on a map image, and by selecting the icon a shot image will be displayed.

However, with Japanese Patent Laid-Open No. 2001-289650 and Japanese Patent Laid-Open No. 2007-129407, there may be cases where it is difficult to search/narrow down a plurality of shot images for/to a specific image. With Japanese Patent Laid-Open No. 2001-289650, shot images at a desired shooting position can be narrowed down, but images cannot be narrowed down using shooting directions. Furthermore, with Japanese Patent Laid-Open No. 2007-129407, in a case where there are a plurality of shot images with the same shooting direction, icons are overlapped and displayed and thus it will be difficult to select a desired icon among the overlapped icons.

SUMMARY OF THE INVENTION

The present invention has been made in consideration of the aforementioned problems, and realizes display control techniques that enable extraction of a shot image in a desired shooting position and shooting direction with easier operation on a map image.

In order to solve the aforementioned problems, the present invention provides a display control apparatus, comprising: a display unit configured to display an image; an operation unit configured to accept a user operation; and a control unit configured to, when a map image is to be displayed on the display unit, display, together with the map image, information corresponding to a plurality of images associated with position information that indicates positions included in a predetermined range within a display range of the map image, wherein when a predetermined operation with respect to the image has been accepted through the operation unit, the control unit performs control to display an image corresponding to a relationship between a direction based on a first operation position and a second operation position of the predetermined operation and direction information associated with the plurality of images.

In order to solve the aforementioned problems, the present invention provides a method of controlling an apparatus having a display unit configured to display an image and an operation unit configured to accept a user operation, the method comprising: when a map image is to be displayed on the display unit, displaying, together with the map image, information corresponding to a plurality of images associated with position information that indicates positions included in a predetermined range within a display range of the map image, wherein in the displaying, when a predetermined operation with respect to the image has been accepted through the operation unit, control is performed to display an image corresponding to a relationship between a direction based on a first operation position and a second operation position of the predetermined operation and direction information associated with the plurality of images.

In order to solve the aforementioned problems, the present invention provides a non-transitory computer-readable storage medium storing a program for causing a computer to execute a method of controlling an apparatus having a display unit configured to display an image and an operation unit configured to accept a user operation, the method comprising: when a map image is to be displayed on the display unit, displaying, together with the map image, information corresponding to a plurality of images associated with position information that indicates positions included in a predetermined range within a display range of the map image, wherein in the displaying, when a predetermined operation with respect to the image has been accepted through the operation unit, control is performed to display an image corresponding to a relationship between a direction based on a first operation position and a second operation position of the predetermined operation and direction information associated with the plurality of images.

According to the present invention, a shot image in a desired shooting position and shooting direction can be extracted with easier operation on a map image.

Further features of the present invention will become apparent from the following description of exemplary embodiments (with reference to the attached drawings).

BRIEF DESCRIPTION OF THE DRAWINGS

FIG. 1 is a block diagram showing an apparatus configuration of a first embodiment.

FIG. 5A is a flowchart showing display control processing for a map image and shot images in the map display mode of the first embodiment.

DESCRIPTION OF THE EMBODIMENTS

Figure 2A:
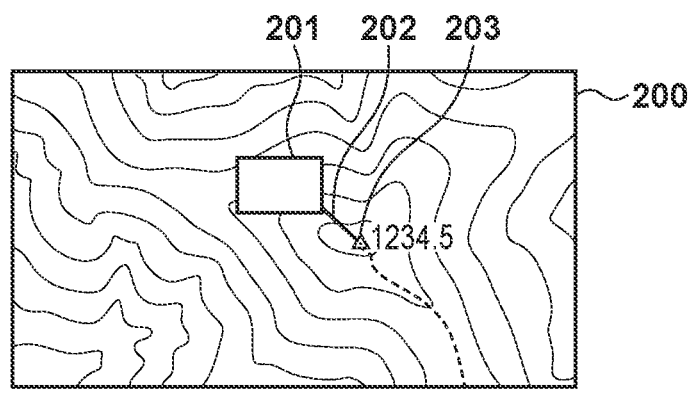
FIGS. 2A to 2D are diagrams showing examples of display in an image extraction mode of the first embodiment.

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

The present embodiment will be described using an example in which a display control apparatus is applied to a digital camera (hereinafter abbreviated as a camera), which is an image capturing apparatus; however, the display control apparatus is also applicable to a mobile telephone having a camera function, a smart device which is a type of mobile telephone, a tablet device, and the like.

<Apparatus Configuration>

First, the configuration and functions of a camera 100 of the present embodiment will be described with reference to FIG. 1.

The camera 100 has a shooting function of shooting and recording images. Also, the camera 100 has a display function of displaying and reproducing the recorded images, and can display shot images in such a manner that the shot images are arranged at shooting locations on a map image.

The camera 100 includes a control unit 101, an image capturing unit 102, an image processing unit 103, a GPS (Global Positioning System) unit 104, and an electronic compass 105. The camera 100 also includes an operation unit 106, a display unit 107, a map information acquisition unit 108, an image acquisition unit 109, a memory 110, and a storage unit 111.

The control unit 101 has an arithmetic processing unit, such as a CPU or an MPU, and controls the entire operations of the camera 100. The control unit 101 realizes control processing of the present embodiment, which will be described later, by executing programs stored in the storage unit 111. The memory 110, for which a RAM or the like is used, temporarily holds constants and variables for the operations of the control unit 101, programs that have been read in from the storage unit 111, map data, image data, metadata associated with the image data, and the like. Furthermore, the control unit 101 functions as an image capturing control unit by controlling the image capturing unit 102, the image processing unit 103, and the memory 110. The control unit 101 also functions as a display control unit by controlling the memory 110, the display unit 107, and the like.

The image capturing unit 102 includes an image sensor comprised of a CCD, a CMOS, or the like that converts an optical image of a subject that has been incident through a non-illustrated optical system into an electrical signal, an A/D converter that converts an analog signal output from the image sensor into a digital signal, and the like.

The image processing unit 103 performs predetermined pixel interpolation, resizing processing including size reduction, and color conversion processing with respect to image data captured by the image capturing unit 102. The image processing unit 103 also performs predetermined arithmetic processing using the captured image data, and based on the obtained arithmetic result, the control unit 101 performs AF (autofocus) processing, AE (automatic exposure) processing, and the like.

The GPS unit 104 includes a GPS antenna for receiving radio waves from GPS satellites and acquiring current position information of the camera 100.

The electronic compass 105 includes a magnetic sensor, and calculates direction information indicating a shooting direction in which the camera 100 is facing by detecting the direction of the geomagnetic field.

The operation unit 106 is comprised of, for example, physical switches, buttons, and the like, accepts a user operation, and outputs a control signal to the control unit 101. The control unit 101 receives the control signal input from the operation unit 106, and controls respective components of the camera 100. Furthermore, the operation unit 106 includes a touchscreen that can detect contact on the display unit 107, and constitutes a GUI as if the GUI enables a user to directly operate a screen displayed on the display unit 107. The control unit 101 detects the user's touch on the touchscreen, and executes processing corresponding to a touch position. The touchscreen may incorporate any of various touchscreen types, such as a resistive type, a capacitive type, a surface acoustic wave type, an infrared type, an electromagnetic induction type, an image recognition type, and an optical sensor type.

The display unit 107 is, for example, a liquid crystal panel or an organic EL panel, and displays images, a GUI, and the like.

The touchscreen is configured integrally with the display unit 107, and can detect contact on the display unit 107. The control unit 101 can detect the following operations on the touchscreen. Placing a finger or a stylus on the touchscreen (hereinafter, touch-down). A state where a finger or a stylus is in contact with the touchscreen (hereinafter, touch-on). Moving a finger or a stylus while it is in contact with the touchscreen (hereinafter, touch-move). Releasing contact between the touchscreen and a finger or a stylus (hereinafter, touch-up). A state where nothing is in contact with the touchscreen (hereinafter, touch-off). The control unit 101 is notified of the foregoing operations and the position coordinates of contact between the touchscreen and a finger or a stylus, and the CPU 101 determines what kind of operation has been performed on the touchscreen based on the information it has been notified of.

Regarding the touch-move, a moving direction of a finger or a stylus that moves on the touchscreen can also be determined for each vertical component and horizontal component on the touchscreen based on a change in the position coordinates. An operation of releasing a finger from the touchscreen immediately after quickly moving the finger by a certain distance while the finger is touching the touchscreen is referred to as a flick. In other words, a flick is an operation of quickly running the finger on the touchscreen like brushing the touchscreen with the finger. It can be determined that a flick has been performed when a touch-up is detected immediately after detecting a touch-move of a predetermined distance or more and a predetermined speed or more. Also, it is determined that a drag has been performed when a touch-move of the predetermined distance or more and a speed lower than the predetermined speed is detected. Furthermore, quickly performing a touch-up after a touch-down on the touchscreen, without performing a touch-move, is referred to as a tap. Quickly performing a tap twice in a row is referred to as a double tap. Moreover, in a state where a plurality of locations (e.g., two points) are touched simultaneously, a touch operation of bringing the touched positions close to each other is referred to as a pinch-in, and a touch operation of distancing the touched positions from each other is referred to as a pinch-out. The pinch-out and the pinch-in are collectively referred to as a pinch operation (or simply a pinch).

The map information acquisition unit 108 reads in map data to be displayed on the display unit 107 from the storage unit 111.

The image acquisition unit 109 reads in image data to be displayed on the display unit 107 and metadata associated with the image data from the storage unit 111, and stores the image data and the metadata into the memory 110.

The storage unit 111 is a nonvolatile memory, such as an electrically erasable and recordable EEPROM, a memory card, a hard disk, or the like. The storage unit 111 stores constants for the operations of the control unit 101, programs, map data, image data, metadata associated with the image data, and the like. The programs mentioned here denote programs for executing flowcharts of control processing, which will be described later, in the present embodiment. Note that the image data stored in the storage unit 111 is not limited to images shot by the camera 100, and may be images acquired from an external device connected via a non-illustrated communication unit.

A shooting information acquisition unit 112 acquires shooting angle of view information or shooting distance information in second, fourth, and sixth embodiments, which will be described later. The specifics will be described later in each embodiment.

Note that the hardware configuration is not limited to the one shown in FIG. 1; for example, one item of hardware may function as respective units of the camera 100 by performing display control, shooting control, image processing control, and the like. Also, a plurality of items of hardware may function as one unit by operating in coordination with one another.

<Image Capturing Function>

Next, the shooting function of the camera 100 will be described. The user can issue a shooting instruction by performing an operation with respect to the operation unit 106, or a touch operation with respect to the display unit 107. Upon receiving the shooting instruction, the control unit 101 executes the shooting control so that the image processing unit 103 applies appropriate image processing to image data captured by the image capturing unit 102, and the resultant image data is stored into the storage unit 111. Also, at the time of shooting, the control unit 101 acquires position information using the GPS unit 104, acquires information of a shooting direction using the electronic compass 105, and stores them as metadata associated with the image data into the storage unit 111.

<Image Display Function>

A description is now given of an image display function of the camera 100. The camera 100 performs full-screen display of an image on the display unit 107, and displays a list of thumbnails of images on the same. Also, the camera 100 can switch to a map display mode. In the map display mode, when a map image is to be displayed on the display unit 107, an image that was shot within a display range of the map image is searched for, and the shot image is displayed on the map image in association with a shooting position. The user can cause an operation mode of the camera 100 to transition to the map display mode by performing an operation with respect to the operation unit 106, or a touch operation with respect to the display unit 107. Upon receiving an instruction for making a transition to the map display mode, the control unit 101 displays the map image on the display unit 107, and the user can scroll the map image and change the display range by dragging a position other than the shot image on the map image. The user can also change the scale of the map image by performing a pinch-in or a pinch-out at a position other than the shot image on the map image.

Figure 2B:
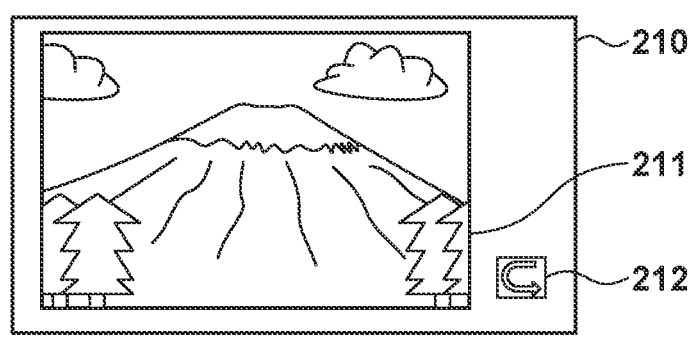

When shot images stored in the storage unit 111 include an image that was shot within the display range of the map image, a thumbnail of the shot image is displayed at a shooting position on the map image. FIG. 2A shows an example of display of a thumbnail; the map image is rendered on a screen 200, and a thumbnail 201 of the shot image and a shooting position 203 on the map image are connected by a line 202. Tapping the thumbnail 201 will lead to full-screen display of the corresponding shot image. FIG. 2B shows an example of full-screen display of the shot image. In FIG. 2B, a shot image 211 and a return button 212 are displayed on a screen 210. Tapping the return button 212 enables a return to map display.

Figure 2C:
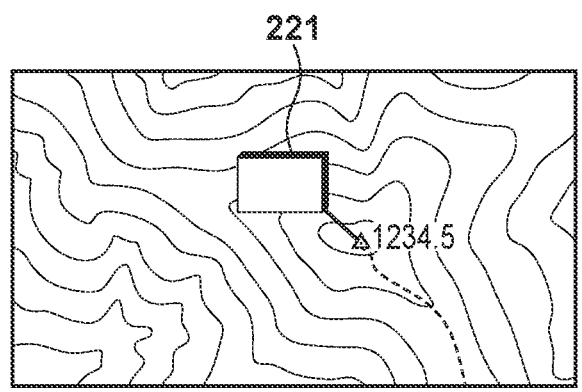
Figure 2D:
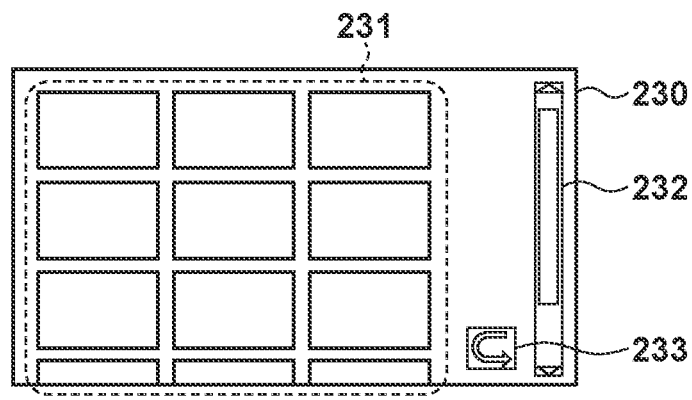

Furthermore, unlike FIG. 2A, FIG. 2C shows an example of display for a case where there are a plurality of shot images with the same shooting position. The difference from FIG. 2A is the display appearance of thumbnails 221. In FIG. 2C, identification is made easy for the user as the thumbnails of the plurality of shot images are displayed in a bundled appearance. A representative image selected from among the plurality of shot images is displayed at the forefront of the bundled group of images. By the user tapping the thumbnails 221 the camera 100 will transition from the map display to display of a list of the thumbnails of the images that were shot at the tapped position. FIG. 2D shows an example of display of a thumbnail list. A screen 230 displays a thumbnail list 231, a scroll bar 232, and a return button 233, and the user can scroll the displayed list by dragging the thumbnail list 231 or the scroll bar 232. Tapping one thumbnail included in the thumbnail list 231 will lead to full-screen display of the corresponding shot image. An example of the full-screen display is the same as that of FIG. 2B. Furthermore, touching the return button 233 in FIG. 2D enables a return to the map display in FIG. 2C, and touching the return button 212 in FIG. 2B enables a return to the display of the thumbnail list in FIG. 2D.

<Image Extraction (Narrow Down) Function>

Next, a function of extracting shot images in the map display mode of the first embodiment will be described.

Figure 3A:
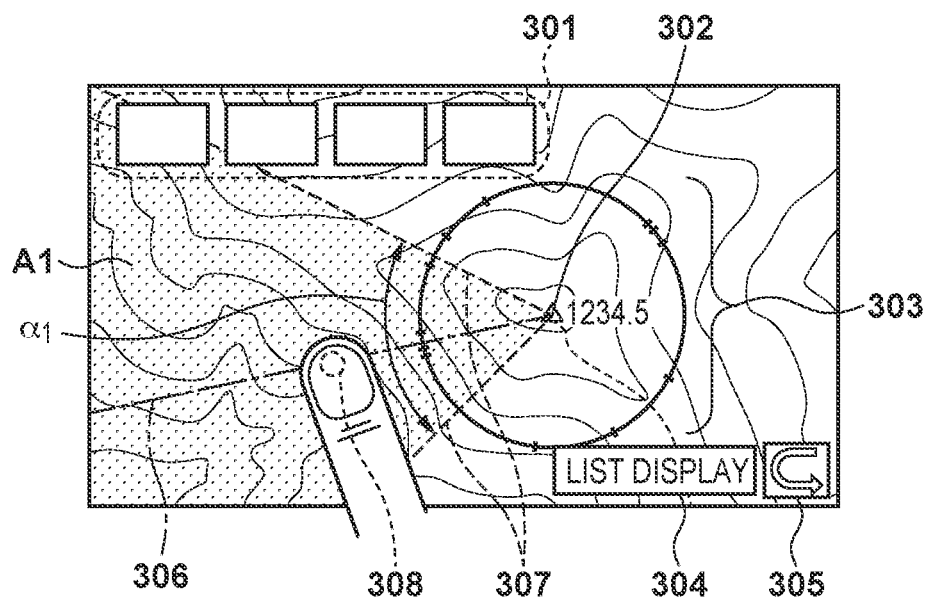
FIGS. 3A and 3B are diagrams showing examples of display in the image extraction mode of the first embodiment.

When the user drags the thumbnails 221 on the map image of FIG. 2C, the camera 100 transitions to an image extraction mode. In the image extraction mode, an image extraction range is set in accordance with a drag distance and a drag direction from a touched shooting position of shot images, and images that satisfy a condition are extracted from among all shot images with the same shooting position and displayed. FIG. 3A shows an example of display after the camera 100 transitions to the image extraction mode by the user starting a drag. A direction indicator 306 and a direction range indicator 307 are rendered; the former uses a line to indicate a direction in which a touch position 308 that is currently dragged is heading, with a shooting position 302 acting as a point of origin, and the latter uses two lines to indicate a predetermined angle range from the direction indicated by the direction indicator 306 in clockwise and counterclockwise directions. A range between the two lines of the direction range indicator 307 (a range A1 with hatching) represents an extraction range of images with shooting directions that are included within the range A1. Shot images with shooting directions that are included within this range A1 are extracted and displayed as thumbnails 301. If the direction indicated by the direction indicator 306 is changed by further continuing the drag, the shooting directions based on which shot images are extracted changes in tandem, and the thumbnails 301 change as well in accordance with the extraction result. A shooting direction distribution indicator 303 indicates a distribution of shooting directions of all images that were shot at the shooting position 302, and points on a circumference centered at the shooting position 302 respectively indicate the shooting directions of the images. By looking at the thumbnails 301 and the shooting direction distribution indicator 303, the user can perform the drag while checking whether images with desired shooting directions are extracted. Furthermore, even if the drag is ended, map display is maintained while the images remain extracted. After the drag is ended, by the user tapping a list display button 304 the camera 100 will transition to the display of the thumbnail list in FIG. 2D, and by the user tapping a return button 305 the camera 100 will return to the map display in FIG. 2C that precedes the drag, thereby ending the image extraction mode.

Figure 3B:
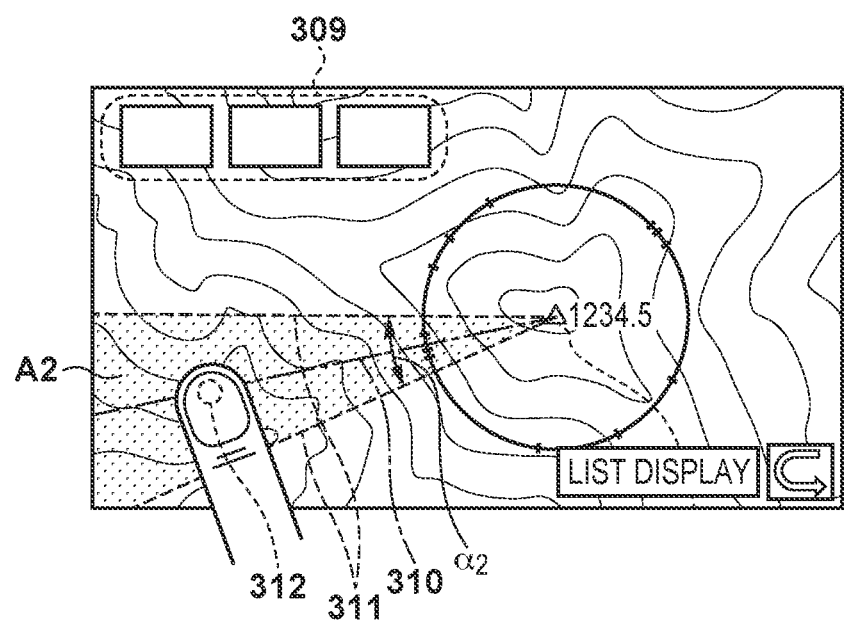
Figure 4A:
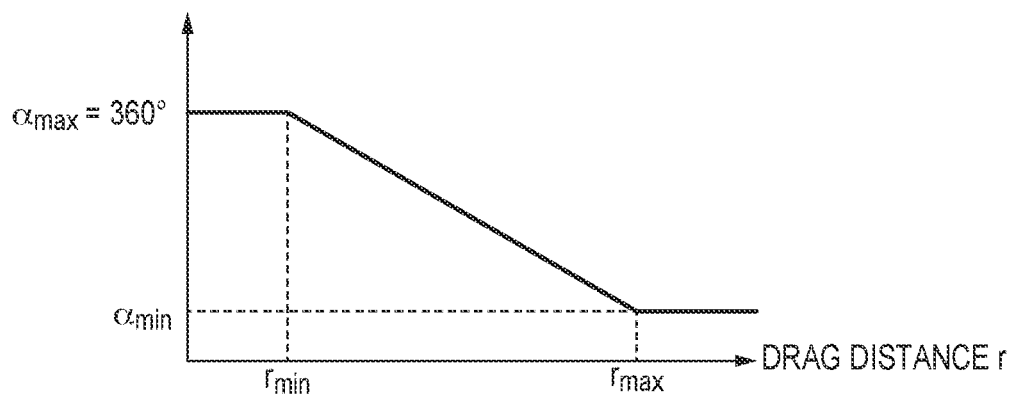
FIG. 4A is a diagram showing a relationship between a drag distance and an extraction range of shooting directions in the image extraction mode of the first embodiment.

Moreover, during the drag, the longer the distance from the shooting position 302 to the touch position 308 that is currently dragged (hereinafter, a drag distance), the smaller the image extraction range. FIG. 3B shows an example of display for a case where the drag distance is longer than that of FIG. 3A. In a case where the drag distance to a touch position 312 that is currently dragged in FIG. 3B is longer than the drag distance to the touch position 308 that is currently dragged in FIG. 3A, an angle $\alpha_2$ formed by an area A2 between two lines of a direction range indicator 311 is smaller than an angle $\alpha_1$ formed by the area A1 in FIG. 3A. FIG. 4A shows a relationship between a drag distance $\gamma$ and an extraction range $\alpha$ of shooting directions. When $\gamma<\gamma_{min}$, the extraction range $\alpha$ is fixed at 360°, and all images are displayed. When the drag distance $\gamma$ satisfies a relationship $\gamma_{min}\leq\gamma\leq\gamma_{max}$, the extraction range $\alpha$ decreases as the drag distance $\gamma$ increases. When the drag distance $\gamma$ satisfies a relationship $\gamma>\gamma_{max}$, the extraction range $\alpha$ has a fixed value. Setting the extraction range $\alpha$ of shooting directions in tandem with the drag distance $\gamma$ in the above-described manner enables the user to narrow down images by increasing the distance while performing the drag.

Figure 4B:
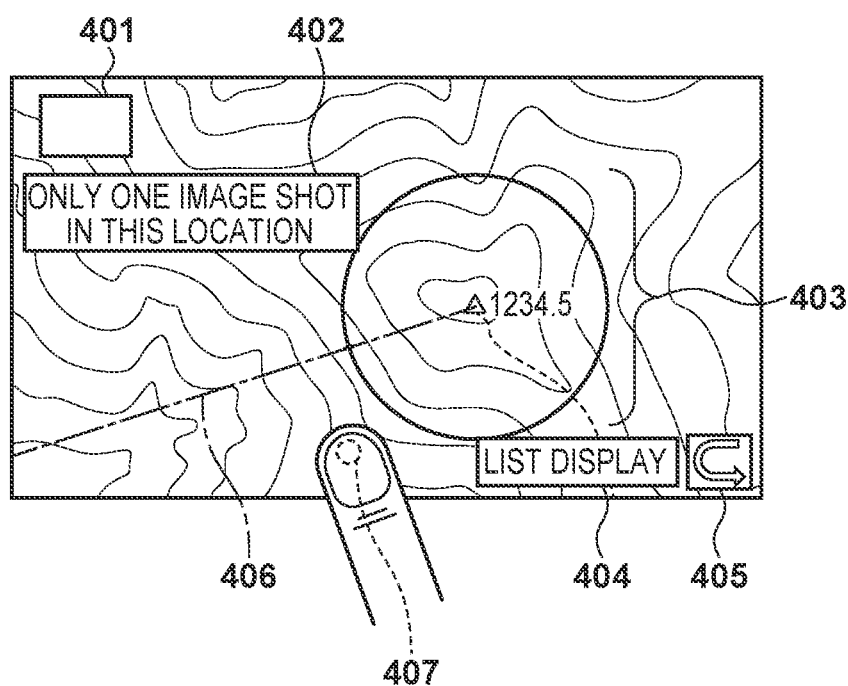
FIG. 4B is a diagram showing an example of display for a case where there is only one shot image at the same shooting position.

Note that when there is only one shot image at the shooting position as shown in FIG. 2A, dragging the thumbnail will lead to the display shown in FIG. 4B. A thumbnail 401 of the shot image is displayed irrespective of a drag position 407 of the user, and a message 402 is displayed to notify the user of the fact that there is only one shot image. A shooting direction distribution indicator 403 is displayed similarly to the case where there are a plurality of shot images, thereby enabling the user to acknowledge the shooting direction of the image of the thumbnail 401. A direction indicator 406 is fixed so as to indicate the shooting direction of the shot image. By the user tapping a list display button 404 the camera 100 will transition to the full-screen display shown in FIG. 2B, and by the user tapping a return button 405 the camera will return to the map display in FIG. 2A that precedes the drag.

<Display Control Processing for Images>

Next, with reference to FIG. 5A, display control processing for a map image and shot images in the map display mode will be described.

Figure 5B:
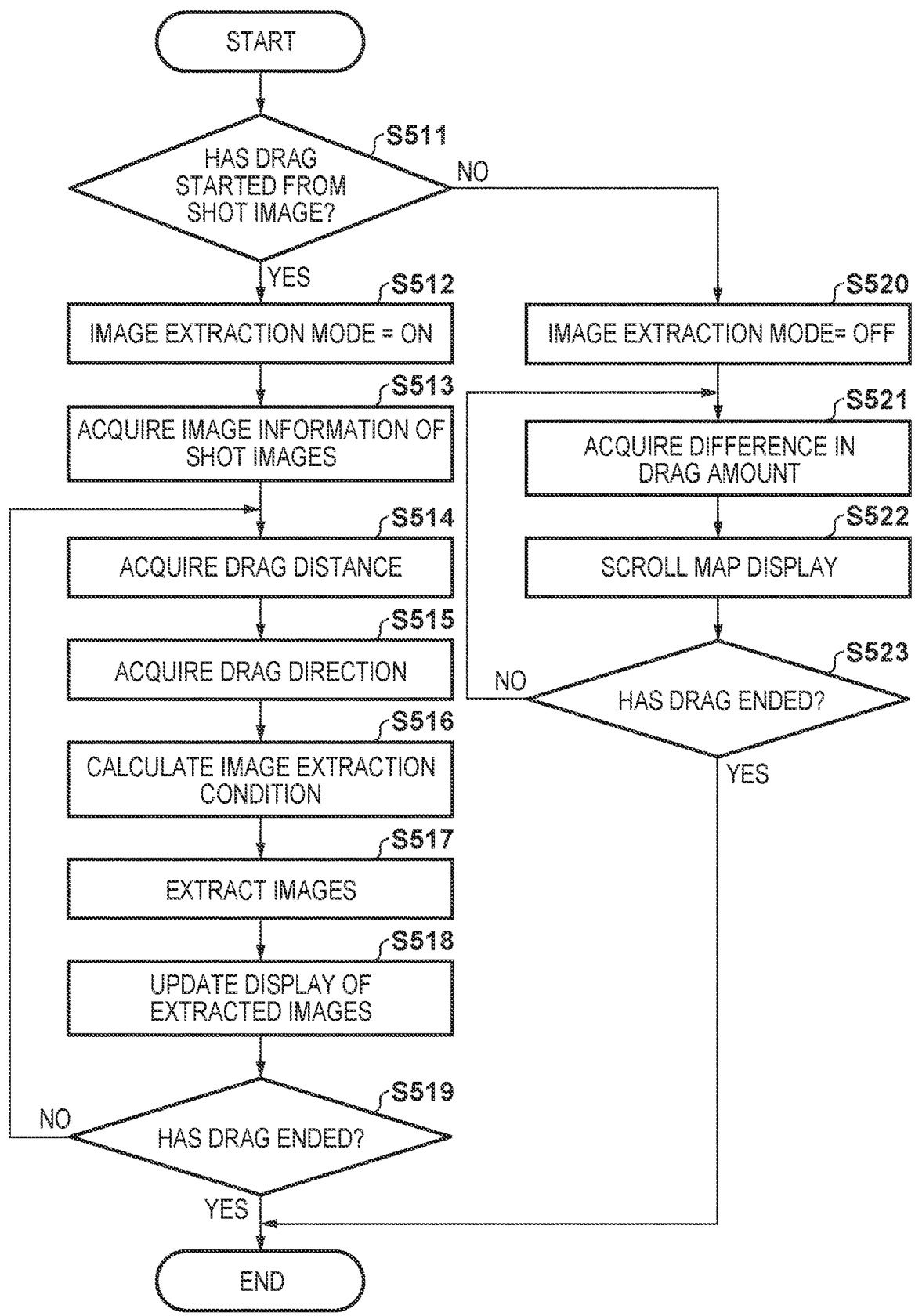
FIG. 5B is a flowchart showing processing during a drag in the map display mode of the first embodiment.

Note that the processing of FIG. 5A is realized by the control unit 101 deploying a program that has been read in from the storage unit 111 to the memory 110 and executing the program. The processing of FIG. 5A is started when the operation mode of the camera 100 has been switched to the map display mode. The same goes for FIGS. 5B, 8, 10, and 13, which will be described later.

In step S501, upon accepting an operation of dragging and scrolling a map image or an operation of, for example, changing the scale with a pinch operation with use of the operation unit 106, the control unit 101 calculates a display range of the map image.

In step S502, the control unit 101 searches for shot images with shooting positions that are included within the display range of the map image calculated in step S501. That control unit 101 reads in shooting position information contained in metadata associated with shot images stored in the storage unit 111, and searches for shot images with shooting positions that are included within the display range of the map image.

In step S503, the control unit 101 performs processing for collecting images that were shot at the same shooting position into a group. Examples of a grouping method include a method of, for instance, dividing the map image into grid-like regions having a square shape, and collecting images with shooting positions that are included within the same region. Furthermore, when there is only one image at the same shooting location, that one image constitutes one group.

In step S504, for each of the groups of step S503, the control unit 101 determines a representative image that is used in displaying a thumbnail. Examples of a method of determining a representative image include a method of, for instance, using an image that was shot last as a representative image.

In step S505, the control unit 101 renders the map image, thumbnails, a UI, and the like on the display unit 107, and ends the processing.

<Processing during Drag in Map Display Mode>

Next, processing during a drag in the map display mode will be described with reference to FIG. 5B.

In step S511, the control unit 101 determines whether the position at which the drag was started (touch-down position) is on a thumbnail; if it is determined that the position is on a thumbnail, the processing proceeds to step S512, and if it is determined that the position is not on a thumbnail, the processing proceeds to step S520.

In step S512, the control unit 101 turns ON the image extraction mode.

In step S513, with use of the image acquisition unit 109, the control unit 101 reads in metadata of images that belong to a group corresponding to the touched thumbnail from the storage unit 111.

In steps S514, S515, the control unit 101 acquires a distance and a direction from a shooting position to a current drag position on the map image.

In step S516, the control unit 101 calculates, from the information acquired in steps S514, S515, an extraction range of shooting directions as an image extraction condition as described with reference to FIGS. 3A and 3B.

In steps S517, S518, the control unit 101 extracts shot images that satisfy the image extraction condition calculated in step S516 from the plurality of shot images with the same shooting position, and updates display of the extracted images.

In step S519, the control unit 101 determines whether the drag has been ended with use of the operation unit 106; if it is determined that the drag has been ended, the processing ends, and during the continuation of the drag, the processing from step S514 to step S518 is executed repeatedly.

Meanwhile, in step S520, the control unit 101 turns OFF the image extraction mode.

In steps S521, S522, the control unit 101 acquires a difference in a drag amount, and scrolls the map image in accordance with a difference amount.

In step S523, the control unit 101 determines whether the drag has been ended with use of the operation unit 106; if it is determined that the drag has been ended, the processing ends, and during the continuation of the drag, the processing of steps S521 and S522 is executed repeatedly.

As described above, according to the present embodiment, the user can extract shot images with desired shooting directions while narrowing down images with a simple operation.

Second Embodiment

Next, a second embodiment will be described.

In the image extraction mode of the first embodiment, images are extracted using information of shooting directions. In contrast, in the second embodiment, images are extracted using information of shooting angles of view in addition to the shooting directions. Below, the differences from the first embodiment will be described.

In the camera 100, the shooting information acquisition unit 112 acquires shooting angle of view information. The shooting information acquisition unit 112 acquires, for example, the focal length of a lens at the time of shooting, the size of the image sensor, the aspect ratio of a recorded image, and a shooting type related to a vertical position/horizontal position at the time of shooting, and acquires the shooting angle of view information by calculating the magnitude of the angle of view in a horizontal direction of a shot image from the acquired items. The shooting angle of view information acquired by the shooting information acquisition unit 112 at the time of shooting is recorded as metadata together with information of a shooting position and a shooting direction.

Figure 6:
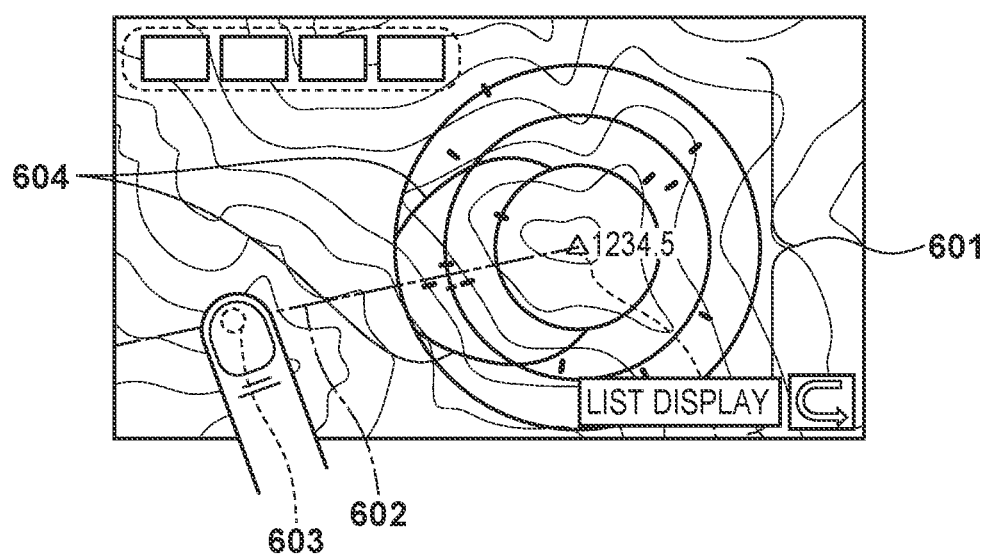
FIG. 6 is a diagram showing an example of display in an image extraction mode of a second embodiment.

FIG. 6 shows an example of display in the image extraction mode of the second embodiment. Unlike the first embodiment, a shooting direction distribution indicator 601 indicates not only shooting directions, but also the magnitudes of shooting angles of view. In FIG. 6, an image with a larger shooting angle of view is placed closer to an inner circle, and an image with a smaller shooting angle of view is placed closer to an outer circle. Furthermore, shooting directions of images corresponding to a drag position 603 are indicated by a direction indicator 602, and images with shooting directions that are included within shooting angles of view of images are extracted. A current image extraction range is indicated by a direction range indicator 604 comprised of two lines. With a decreasing distance to the outer circle, an image has a smaller shooting angle of view, and thus a range of shooting directions to be extracted becomes smaller. Although the extraction range is not changed in accordance with a drag distance in the present embodiment, the extraction range may be changed in accordance with the drag distance.

As described above, according to the present embodiment, images that reliably show the directions desired by the user can be extracted with a simple operation.

Third Embodiment

Next, a third embodiment will be described.

In the third embodiment, shot images that have been extracted in the image extraction mode of the first embodiment are displayed in such a manner that they are sorted in accordance with shooting directions.

Figure 7A:
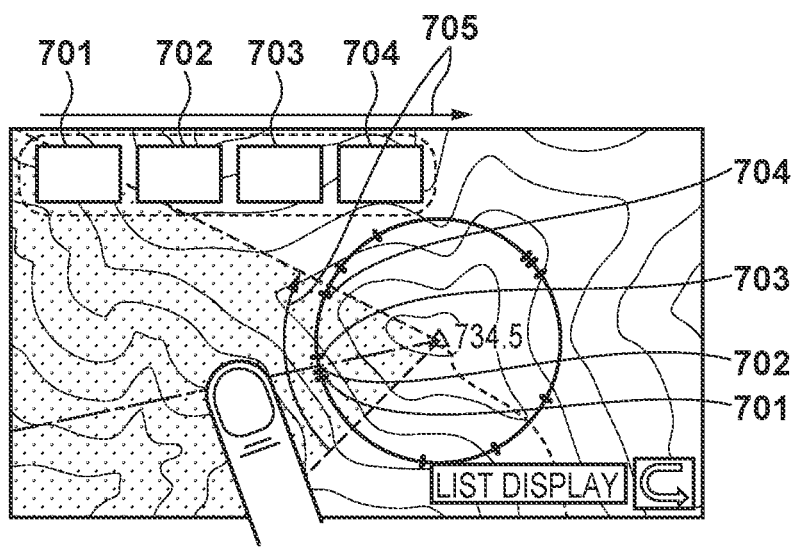
FIGS. 7A to 7C are diagrams showing examples of display for a case where sorting has been performed in accordance with shooting directions in a map display mode of a third embodiment.

FIG. 7A shows an example of display for a case where shot images have been sorted in accordance with shooting directions. Unlike the first embodiment, thumbnails 701 to 704 represent shot images that are included in an image extraction range and that are displayed in such a manner they are sorted in accordance with shooting directions. In FIG. 7A, the thumbnails of the shot images within the extraction range are displayed in a clockwise order 705 of shooting directions, starting from the left in the figure.

In this way, the thumbnails are displayed in such manner that the order of arrangement of the thumbnails matches the order of the shooting directions of the respective shot images when the user views the image extraction range in a clockwise direction, thereby enabling the user to easily understand the positional relationships among the shooting directions of the respective shot images.

Figure 7B:
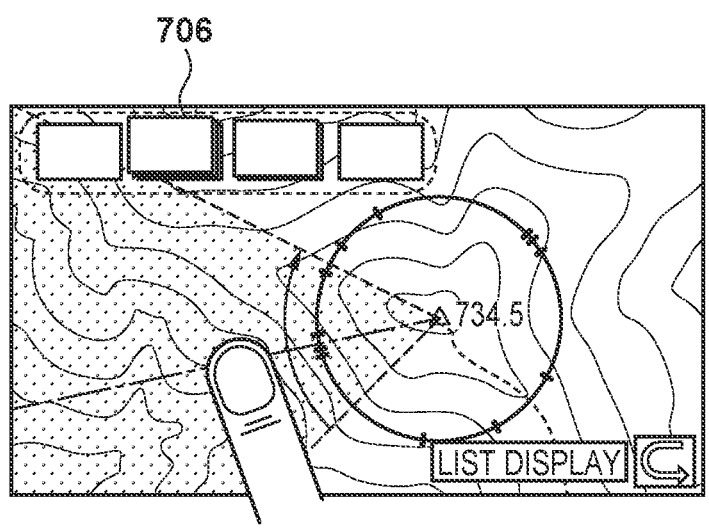

Unlike FIG. 7A, FIG. 7B shows an example of display for a case where there are a plurality of shot images with the same shooting position. In FIG. 7B, identification is made easy for the user as thumbnails of the plurality of shot images with the same shooting direction are displayed in a bundled appearance 706. A representative image selected from among the plurality of shot images is displayed at the forefront of the bundled group of images.

Figure 7C:
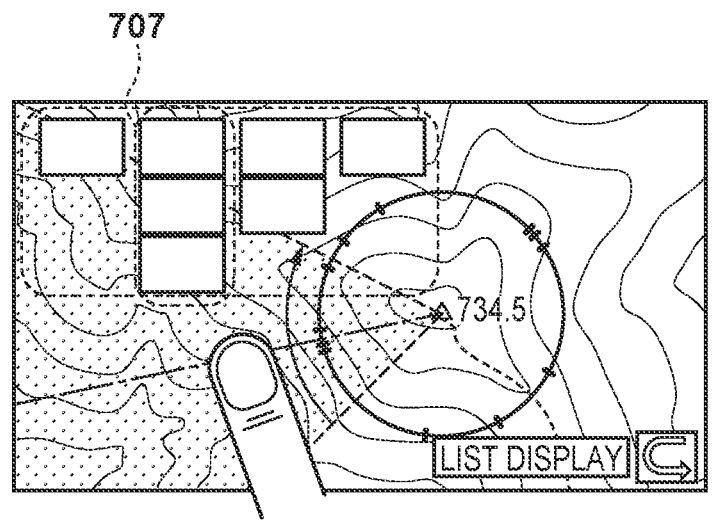

Furthermore, similarly to FIG. 7B, FIG. 7C shows another example of display for a case where there are a plurality of shot images with the same shooting position. In FIG. 7C, identification is made easy for the user as thumbnails of the plurality of shot images with the same shooting direction are displayed in a vertically arranged appearance 707.

<Processing for Display with Sorting in Accordance with Shooting Directions>

Figure 8:
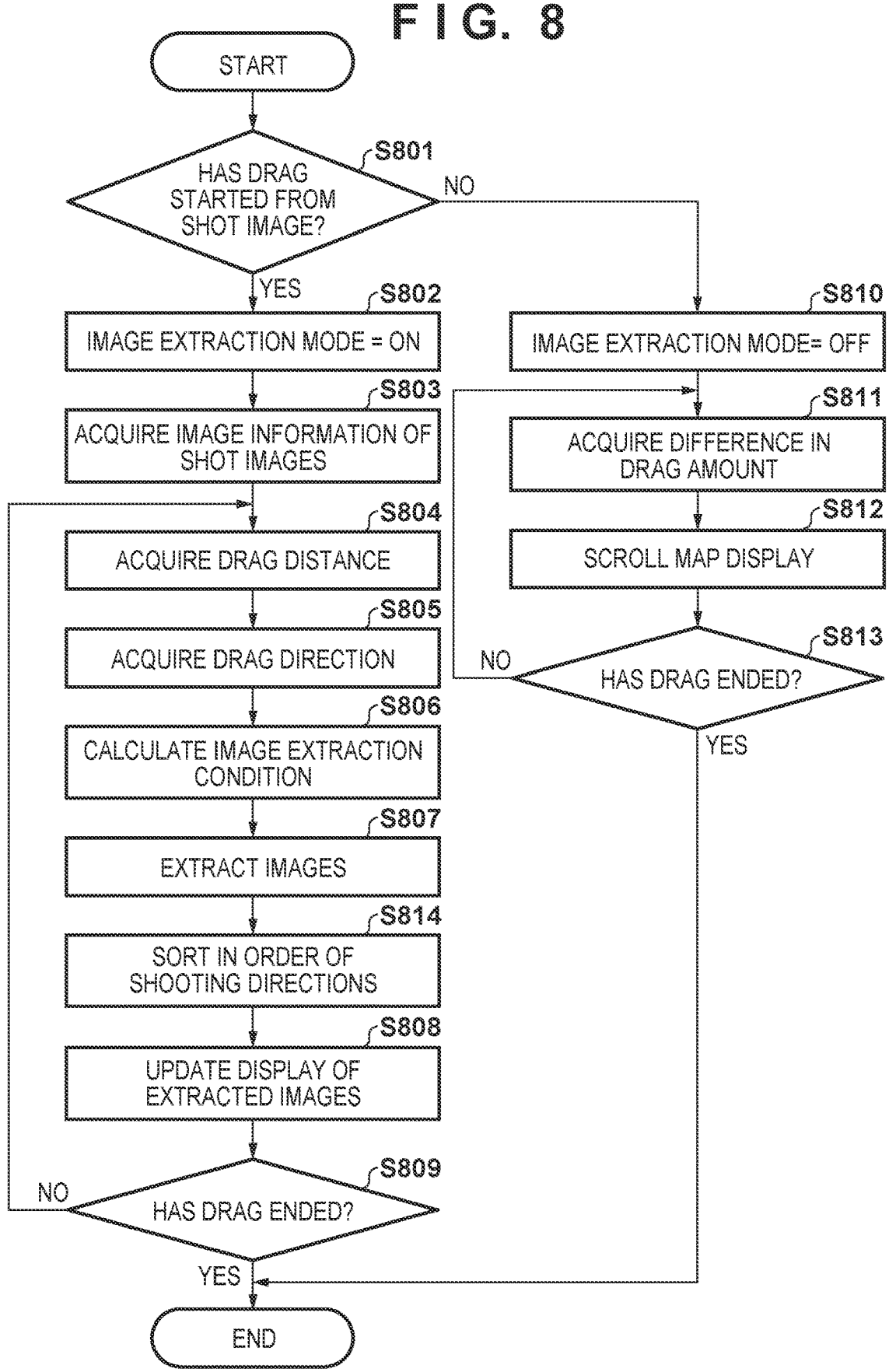
FIG. 8 is a flowchart showing processing which is performed during a drag in the map display mode of the third embodiment, and which is for displaying shot images in such a manner that the shot images are sorted in accordance with shooting directions.

Next, with reference to FIG. 8, a description is given of processing which is performed during a drag in the map display mode, and which is for displaying extracted shot images in such a manner that the shot images are sorted in accordance with shooting directions.

Note that steps S801 to S807 and steps S808 to S813 of FIG. 8 are similar to steps S511 to S523 of FIG. 5B, and thus a description thereof will be omitted.

Referring to FIG. 8, in step S814, the control unit 101 determines an order in which the images extracted in step S807 are sorted and displayed in accordance with shooting directions.

In step S808, the control unit 101 updates display of the extracted images in conformity with the order determined in step S814.

As described above, according to the present embodiment, even in a case where there are a plurality of shot images in the same direction, as images are displayed in such a manner that they are divided into groups that each correspond to the same shooting direction, the user can easily understand the relative relationships among the directions of the respective groups without mixedly recognizing shot images.

Fourth Embodiment

Next, a fourth embodiment will be described.

In the image extraction mode of the first embodiment, images are extracted using information of shooting directions. In contrast, in the fourth embodiment, images are extracted using information of shooting distances. Below, the differences from the first embodiment will be described.

In the camera 100, the shooting information acquisition unit 112 acquires shooting distance information. The shooting information acquisition unit 112 acquires the shooting distance information by calculating a distance between a shot subject and the camera 100. The shooting distance information acquired by the shooting information acquisition unit 112 at the time of shooting is recorded as metadata together with information of a shooting position. Regarding a method of calculating a shooting distance, in a case where the camera 100 uses an image sensor of a pupil division type, the shooting distance can be calculated based on a defocus amount that is obtained by computing a correlation between images corresponding to two divided pupil regions. In this case, regarding the shooting distance information, a distance to a main subject or a distance of frequent occurrence within a shot image is used as the shooting distance information. As another method, it is also possible to calculate a distance to a focus position (that is, a main subject) in a shot image based on a focal position. In this case, a value calculated from the focal position can be used as the shooting distance information, or a certain range in a depth direction can also be used as the shooting distance information based on the focal position and information of the depth of field. Although the above has described a method of calculating a shooting distance from information during the shooting, a distance from a shooting position to a subject may be measured by irradiating the subject with laser light and detecting reflected light of the laser light using a distance measurement apparatus, and the measured distance may be used as the shooting distance information.

<Image Extraction (Narrow Down) Function>

Next, a function of extracting shot images in the map display mode of the fourth embodiment will be described.

Figure 9A:
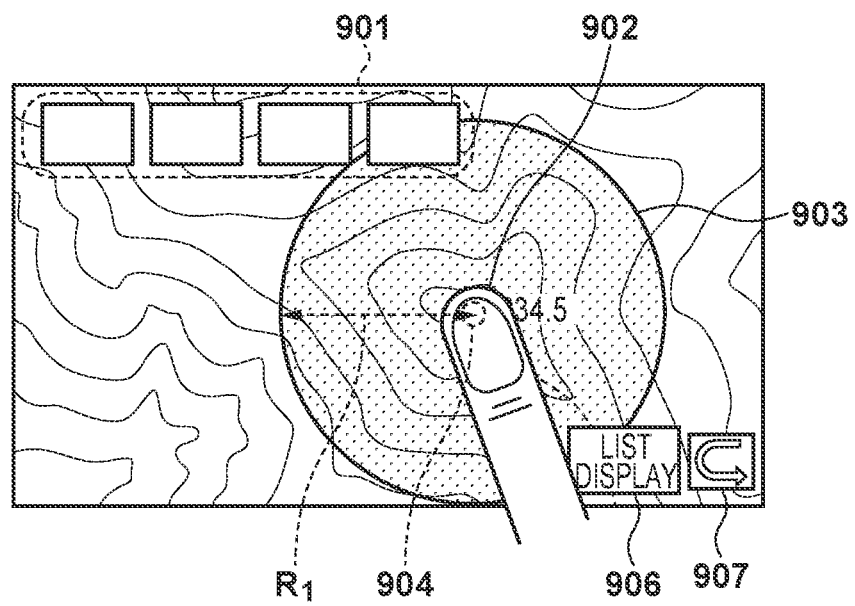
FIGS. 9A and 9B are diagrams showing examples of display in an image extraction mode of a fourth embodiment.
Figure 9B:
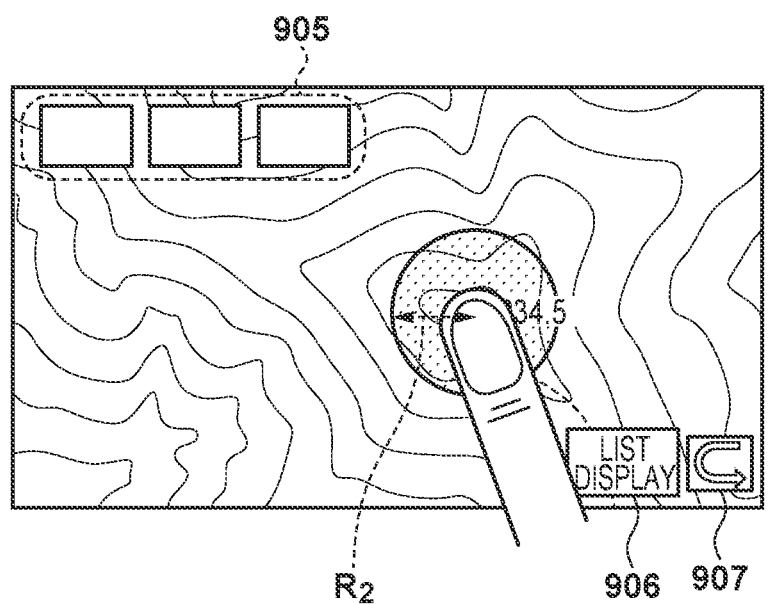

When the user long-presses the thumbnails 221 in FIG. 2C, the camera 100 transitions to an image extraction mode. In the image extraction mode, an image extraction range is set in accordance with a time period of long-pressing of a shot image that has been touched, and images that satisfy a condition are extracted from among all shot images with the same shooting position and displayed. FIG. 9A shows an example of display after the camera 100 transitions to the image extraction mode by the user starting a long-press. By long-pressing a touch position 904, the image extraction mode is started, and a circle 903 centered at a shooting position 902 is rendered. A radius $R_1$ of the circle 903 indicates an extraction range of shooting distances; shot images with shooting distances that are shorter than the radius $R_1$ are extracted and displayed as thumbnails 901. With the duration of the time period of long-pressing, the radius $R_1$ decreases, thereby reducing the shooting distances of images to be extracted. FIG. 9B shows an example of display for a case where the long-press has been performed for a time period longer than that in FIG. 9A. By performing the long-press for a long time period, the range of shooting distances of images to be extracted is narrowed down from the radius $R_1$ to a radius $R_2$. By looking at the thumbnails 901, the user can adjust the time period of long-pressing while checking whether images with desired shooting distances are extracted. The shooting range to be extracted can be reset by resetting the time period of long-pressing when the time period of long-pressing has exceeded a predetermined time period, and the time period of long-pressing can also be reconfigured when the range has been overly narrowed down. Furthermore, even if the long-press is ended, map display is maintained while the images remain extracted. After the long-press is ended, by the user tapping a list display button 906 the camera 100 will transition to the display of the thumbnail list in FIG. 2D, and by the user tapping a return button 907 the camera 100 will return to the map display in FIG. 2C that precedes the long-press, thereby ending the image extraction mode.

<Processing during Long-Press in Map Display Mode>

Next, processing during the long-press in the map display mode will be described with reference to FIG. 10.

Figure 10:
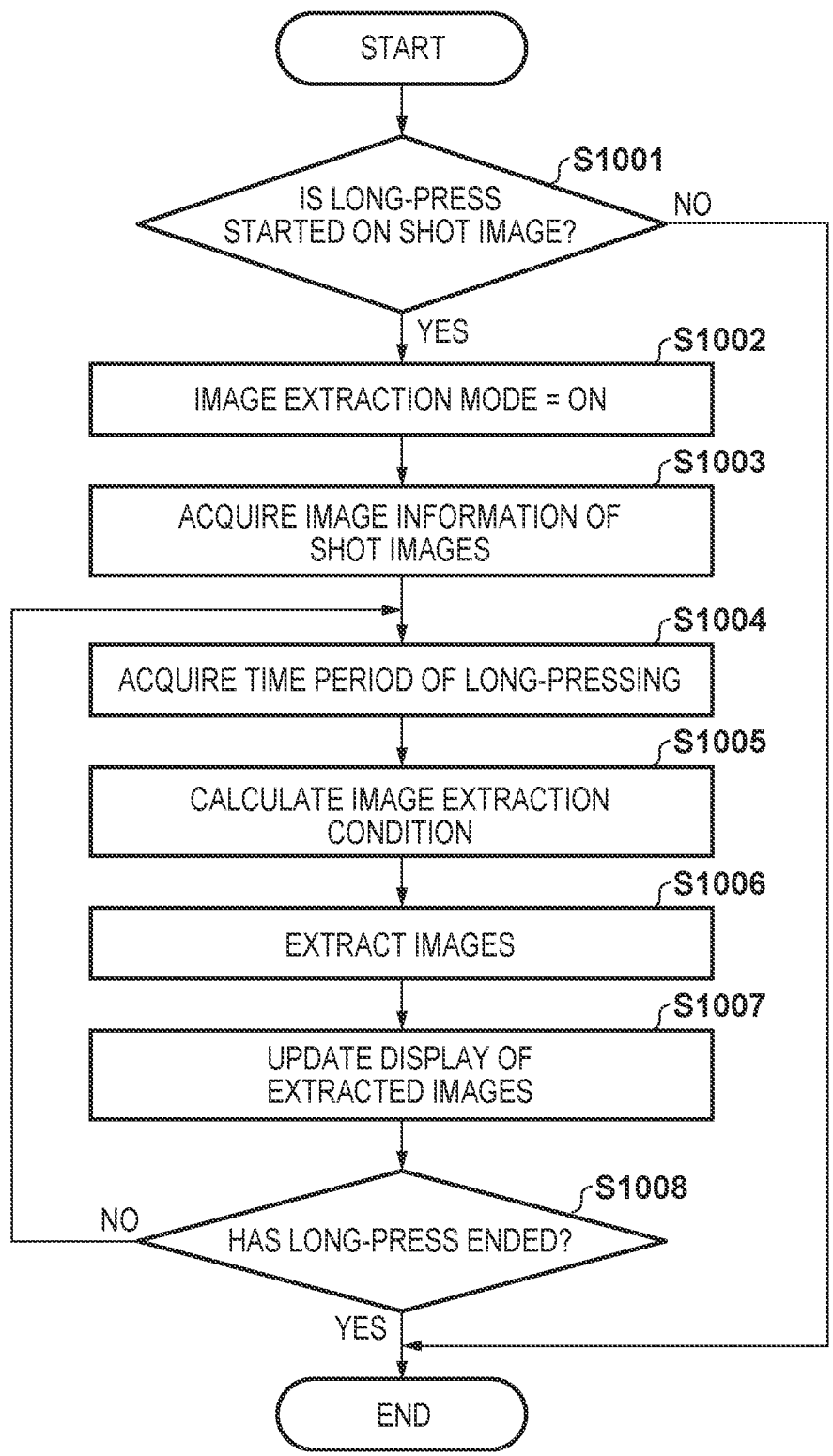
FIG. 10 is a flowchart showing processing during long-pressing in the map display mode of the fourth embodiment.

Referring to FIG. 10, in step S1001, the control unit 101 determines whether the position at which the long-press was started (touch-down position) is on a thumbnail; if it is determined that the position is on a thumbnail, the processing proceeds to step S1002, and if it is determined that the position is not on a thumbnail, the processing ends.

In steps S1002, S1003, similarly to steps S512, S513 of FIG. 5B, the image extraction mode is turned ON, and with use of the image acquisition unit 109, metadata of images that belong to a group corresponding to the long-pressed thumbnail is read in from the storage unit 111.

In step S1004, the control unit 101 acquires a time period of long-pressing with use of the operation unit 106.

In steps S1005 to S1007, similarly to steps S516 to S518 of FIG. 5B, an image extraction condition is calculated from the information acquired in step S1004, images that satisfy the image extraction condition are extracted, and display of the extracted images is updated.

In step S1008, the control unit 101 determines whether the long-press has been ended with use of the operation unit 106; if it is determined that the long-press has been ended, the processing ends, and during the continuation of the long-press, the processing from step S1004 to step S1007 is executed repeatedly.

Although the shooting distances are set in accordance with the time period of long-pressing in the fourth embodiment, in the case of a touchscreen with a pressure detection capability, it is also possible to change the shooting distances to be extracted in accordance with a detected pressure.

Furthermore, the fourth embodiment can be implemented in combination with the first embodiment. When the fourth embodiment is implemented in combination, images can be extracted using shooting directions in accordance with a drag operation, and images can be extracted using shooting distances in accordance with a time period of long-pressing after the drag. By thus combining a drag operation and a long-press operation, images can be extracted in accordance with any shooting directions and shooting distances.

As described above, according to the present embodiment, the user can extract images with desired shooting distances, such as short-distance images obtained by shooting a plan, a flower, a person, and the like, and long-distance images obtained by shooting mountains and other landscapes, while narrowing down a plurality of shot images with the same shooting position with a simple operation.

Fifth Embodiment

Next, a fifth embodiment will be described.

In the image extraction mode of the fourth embodiment, images are extracted using shooting distances that have been set in accordance with a time period of long-pressing. Furthermore, the combination of a long-press operation of the fourth embodiment and a drag operation of the first embodiment enables image extraction using shooting directions simultaneously with image extraction using shooting distances. In contrast, in the fifth embodiment, images are extracted using information of shooting directions and shooting distances with a drag operation alone. Below, the differences from the first and fourth embodiments will be described.

Figure 11A:
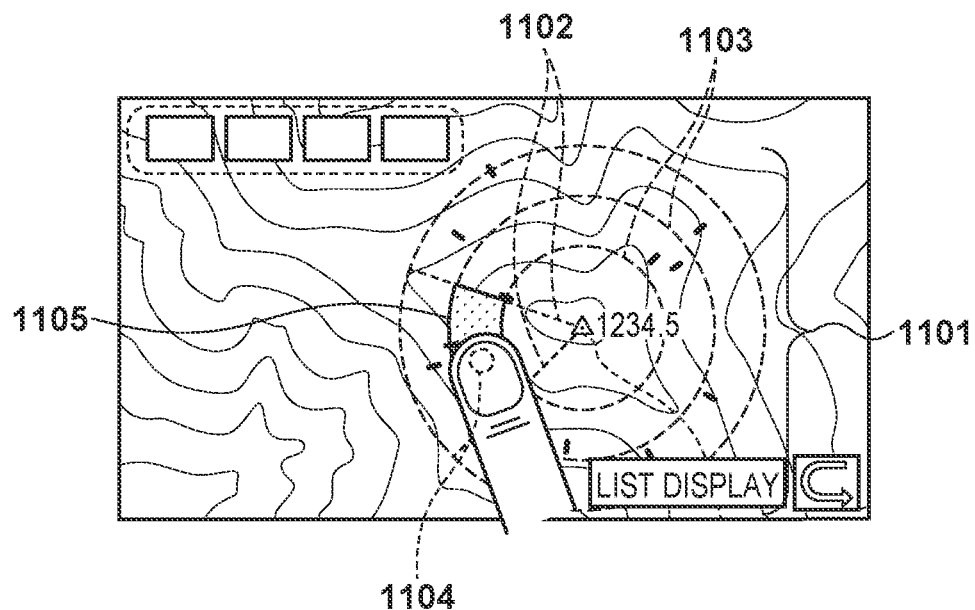
FIGS. 11A and 11B are diagrams showing examples of display in an image extraction mode of a fifth embodiment.
Figure 11B:
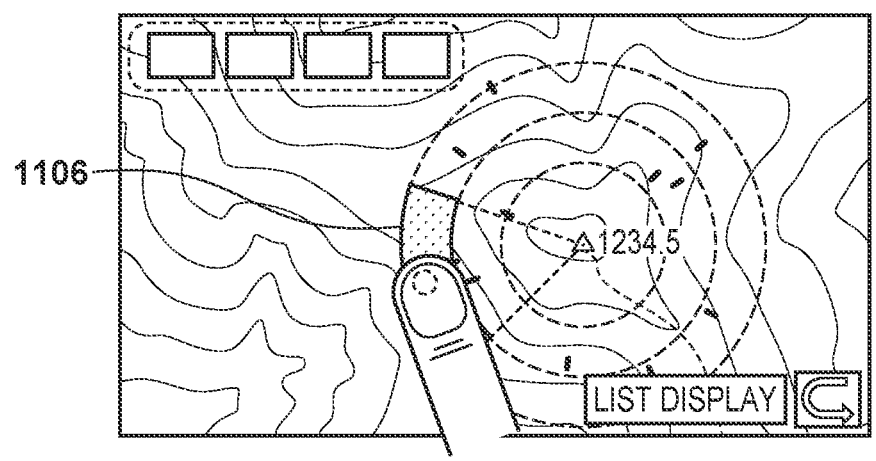

FIGS. 11A and 11B show examples of display for a case where images are extracted using shooting directions and shooting distances in the fifth embodiment. Unlike the first embodiment, a shooting direction distribution indicator 1101 indicates not only shooting directions, but also shooting distances. In FIGS. 11A and 11B, an image with a shorter shooting distance is placed closer to an inner circle, and an image with a longer shooting distance is placed closer to an outer circle. In the present embodiment, the outermost circle indicates that the shooting distance is infinity. Furthermore, an image extraction range corresponding to a drag position 1104 (shooting directions and shooting distances) is indicated by a fan-shaped quadrilateral 1105 enclosed by two lines 1102 indicating shooting directions and concentric circles 1103 indicating shooting distances. Since the closer the images are to an outer circle, the longer the shooting distances of the images, the range of shooting distances to be extracted is selected in accordance with a drag amount. FIG. 11B shows an example of display for a case where the drag distance is longer than that of FIG. 11A. With the increase in the drag amount, a quadrilateral 1106 that has longer shooting distances than the quadrilateral 1105 of FIG. 11B acts as the range of shooting distances to be extracted.

As described above, according to the present embodiment, photographs conforming to the directions and distances desired by the user can be extracted with a simple operation.

Sixth Embodiment

Next, a sixth embodiment will be described.

In the image extraction mode of the first embodiment, images are extracted using shooting directions. In contrast, in the sixth embodiment, images are extracted using shooting directions, and the extracted images are displayed in such a manner that they are sorted using shooting distances. Below, the differences from the first embodiment will be described.

In the camera 100, the shooting information acquisition unit 112 acquires shooting distance information. The shooting information acquisition unit 112 acquires, for example, focus position information, and acquires a distance between a subject corresponding to a focus position and the image capturing unit 102. The shooting distance information acquired by the shooting information acquisition unit 112 is recorded as metadata together with information of a shooting position and a shooting direction.

Figure 12A:
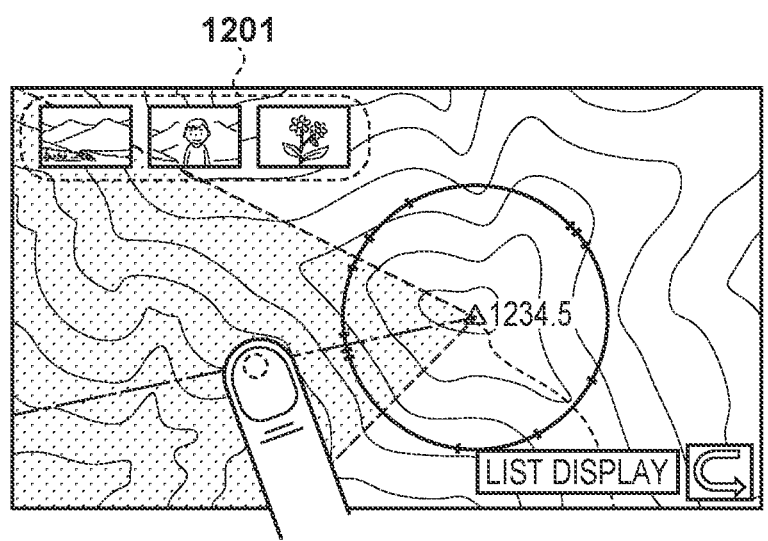
FIGS. 12A and 12B are diagrams showing examples of display for a case where shot image that have been extracted using shooting directions have been sorted in accordance with shooting distances in a map display mode of a sixth embodiment.

FIG. 12A shows an example of display for a case where images that have been extracted using shooting directions have been sorted in accordance with shooting distances. A shooting direction distribution indicator 1201 displays thumbnails of shot images included in an extraction range of shooting directions in such a manner that the thumbnails are sorted in accordance with shooting distances.

Figure 12B:
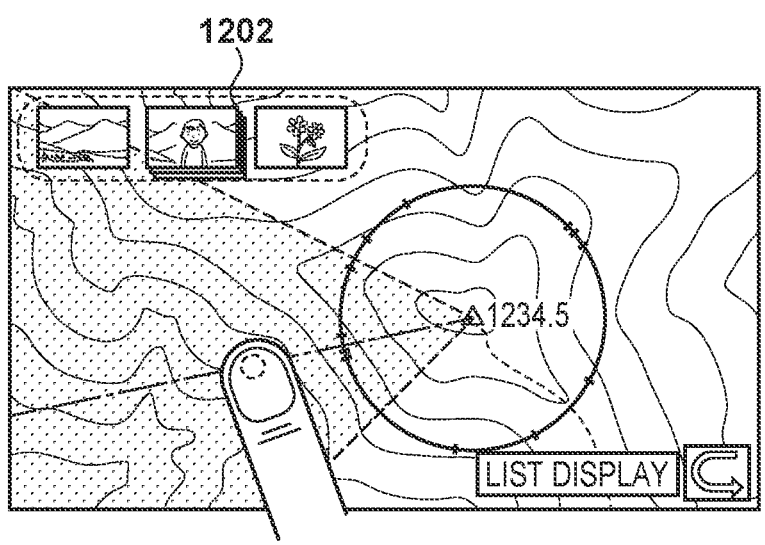

Depending on subjects, shooting distances tend to become similar to one another; for example, images in which a shot subject is a plant, a flower, or a person often shot at a close distance, whereas landscape images are often shot at a long distance. Therefore, when too many images have been extracted to be displayed on the screen, the images may be divided into groups that respectively correspond to predetermined distance ranges, and a representative image of each group may be displayed. FIG. 12B shows an example of display in which images that have been extracted using shooting directions have been sorted in accordance with shooting distances and divided into groups that respectively correspond to shooting distance ranges. In FIG. 12B, unlike the display appearance in FIG. 12A, identification is made easy for the user as thumbnails of a plurality of shot images in the same group are displayed in a bundled appearance 1202. A representative image selected from among the plurality of shot images is displayed at the forefront of the bundled group of images. Furthermore, when the user selects the foremost thumbnail 1202, a list of the thumbnails within the same group is displayed in a selectable manner.

<Processing during Drag in Map Display Mode>

Figure 13:
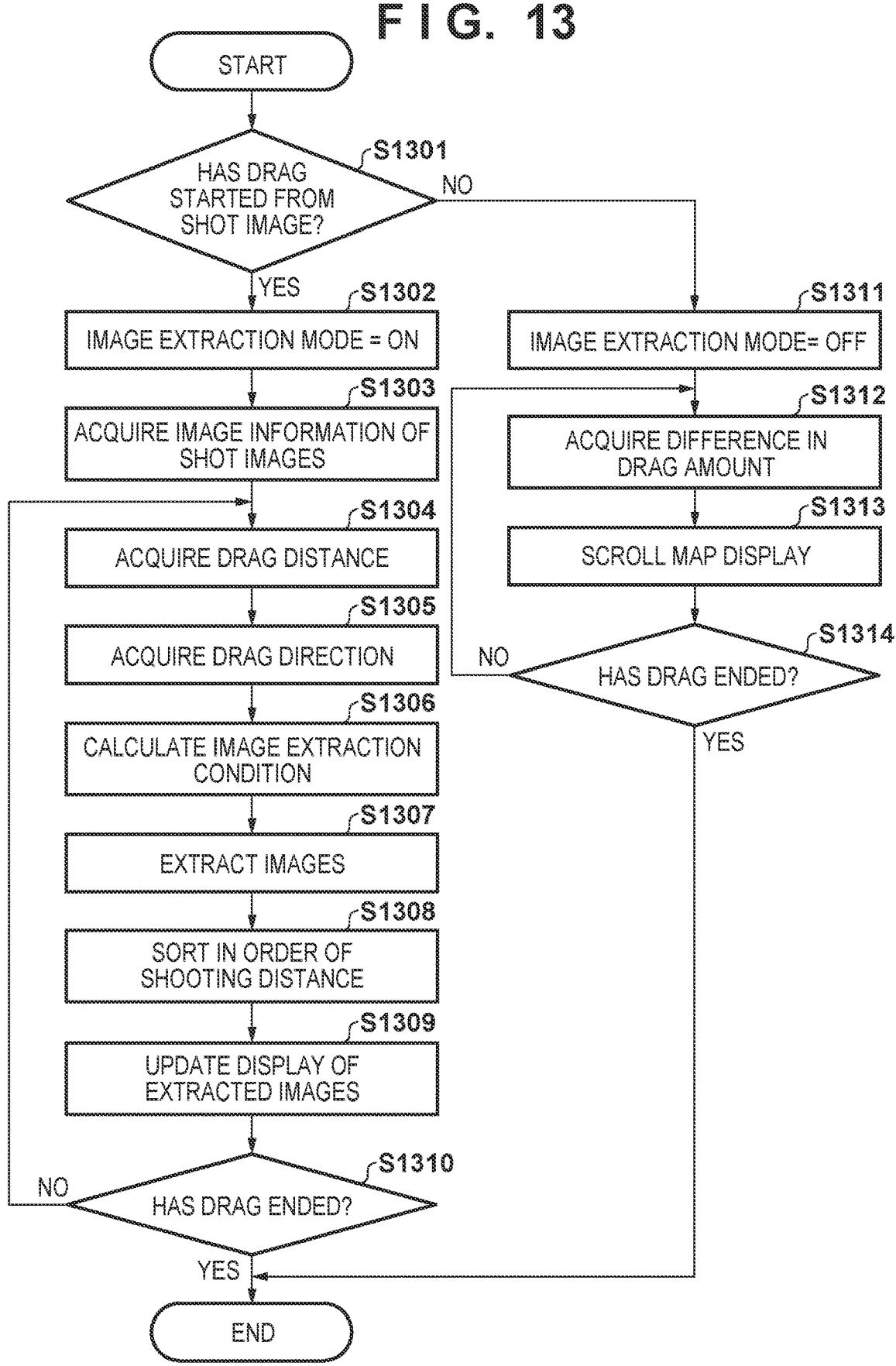
FIG. 13 is a flowchart showing processing which is performed during a drag in the map display mode of the sixth embodiment, and which is for displaying shot images in such a manner that the shot images are sorted in accordance with shooting distances.

Next, with reference to FIG. 13, a description is given of processing which is performed during a drag in the map display mode, and which is for displaying shot images in such a manner that the shot images are sorted in accordance with shooting distances.

Note that steps S1301 to S1307 and steps S1309 to S1314 of FIG. 13 are similar to steps S511 to S523 of FIG. 5B, and thus a description thereof will be omitted.

Referring to FIG. 13, in step S1308, the control unit 101 determines an order in which the images extracted in step S1307 are sorted and displayed in accordance with shooting distances.

In step S1309, the control unit 101 updates display of the extracted images in conformity with the order determined in step S1308.

As described above, according to the present embodiment, the user can extract images with desired shooting directions while narrowing down images with a simple operation, and even if a large number of images have been extracted, the search for target images is facilitated by sorting the extracted images in accordance with shooting distances.

Note that in each of the above-described embodiments, a thumbnail obtained by reducing the size of a representative image is displayed at a shooting position on a map image; however, a preset image, such as an icon, may be displayed in place of the thumbnail.

Furthermore, the present embodiments are not limited to being realized with tap and drag operations with respect to the touchscreen, and can also be realized by replacing these operations with click and drag operations using a mouse.

Moreover, an angle of elevation or depression at the time of shooting may be acquired and recorded as metadata, and a corresponding image may be excluded from extraction targets in the image extraction mode if the angle of elevation or depression is displaced from a horizontal plane by a certain degree or more. In this case, it is possible to prevent the extraction of images that are not appropriate as images to be extracted using shooting directions, such as images obtained by shooting in a direction that is close to a directly overhead direction or a directly underneath direction.

Other Embodiment

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-158569, filed Aug. 27, 2018 which is hereby incorporated by reference herein in its entirety.

What is claimed is:

1. A display control apparatus comprising:
a display unit;
an operation unit; and
a control unit configured to, when a map image is to be displayed on the display unit, display, together with the map image, an item corresponding to a plurality of images associated with position information that indicates positions included in a predetermined range within a display range of the map image,
wherein when a predetermined operation with respect to the item has been accepted through the operation unit, the control unit performs control to display, on the map image, one or more images among the plurality of images corresponding to the item which has accepted the predetermined operation, based on a relationship between (a) a direction based on a first operation position and a second operation position of the predetermined operation and (b) direction information associated with the plurality of images,
wherein, in a case where the first operation position is not included in a region corresponding to the item, the control unit does not perform control to display the one or more images on the map image and changes a display range of the map image,
wherein the operation unit is a touchscreen installed in the display unit,
wherein the predetermined operation is a drag operation, and
wherein the control unit is implemented by one or more processors.

2. The apparatus according to claim 1, wherein the control unit performs control to display an image associated with direction information that indicates a direction included within a predetermined angle range centered at the direction based on the first operation position and the second operation position of the predetermined operation.

3. The apparatus according to claim 2, wherein the control unit performs control to display an image with a shooting angle of view that is included within the predetermined angle range.

4. The apparatus according to claim 2, wherein the control unit changes the predetermined angle range and displays the predetermined angle range on the map image in accordance with a distance based on the first operation position and the second operation position of the predetermined operation.

5. The apparatus according to claim 1, wherein the control unit displays, on the map image, a distribution of shooting directions of a plurality of images with the same shooting position.

6. The apparatus according to claim 1, wherein the control unit excludes an image with an angle of elevation or depression that exceeds a predetermined angle of elevation or depression from display targets.

7. The apparatus according to claim 1, wherein the control unit displays a list of displayed images on the map image.

8. The apparatus according to claim 7, wherein the control unit changes a display appearance of an image between a case where there is one image with the same shooting position and a case where there are a plurality of images with the same shooting position.

9. The apparatus according to claim 1, wherein the control unit scrolls the map image in response to an operation that is performed through the operation unit with respect to a position that is not a region corresponding to the item on the map image.

10. The apparatus according to claim 1, wherein when a plurality of images are to be displayed, the control unit displays the plurality of images on the map image in such a manner that the plurality of images are sorted in accordance with shooting directions.

11. The apparatus according to claim 1, wherein the control unit groups images that have been sorted in accordance with shooting directions by each of predetermined shooting directions and displays the grouped images.

12. The apparatus according to claim 1, wherein the control unit performs image extraction in accordance with a distance based on the first operation position and the second operation position of the predetermined operation and a shooting distance to an object at the time of shooting of an image.

13. The apparatus according to claim 12, wherein when a plurality of images are to be displayed, the control unit displays the plurality of images on the map image in such a manner that the plurality of images are sorted in accordance with the shooting distance.

14. The apparatus according to claim 13, wherein the control unit groups the images that have been sorted in accordance with the shooting distance by each of predetermined shooting directions and displays the grouped images.

15. The apparatus according to claim 14, wherein the control unit displays a representative image for each group.

16. The apparatus according to claim 15, wherein the control unit changes a display appearance of an image between a case where there is one image that belongs to the group and a case where there are a plurality of images that belong to the group.

17. A method of controlling an apparatus including a display unit and an operation unit, the method comprising:

when a map image is to be displayed on the display unit, displaying, together with the map image, an item corresponding to a plurality of images associated with position information that indicates positions included in a predetermined range within a display range of the map image, wherein in the displaying, when a predetermined operation with respect to the item has been accepted through the operation unit, control is performed to display, on the map image, one or more images among the plurality of images corresponding to the item which has accepted the predetermined operation, based on a relationship between (a) a direction based on a first operation position and a second operation position of the predetermined operation and (b) direction information associated with the plurality of images, wherein, in a case where the first operation position is not included in a region corresponding to the item, the control is not performed to display the one or more images on the map image and changes a display range of the map image, wherein the operation unit is a touchscreen installed in the display unit, and wherein the predetermined operation is a drag operation.

18. A non-transitory computer-readable storage medium storing a program for causing a computer to execute a method of controlling an apparatus including a display unit and an operation unit, the method comprising:

when a map image is to be displayed on the display unit, displaying, together with the map image, an item corresponding to a plurality of images associated with position information that indicates positions included in a predetermined range within a display range of the map image, wherein in the displaying, when a predetermined operation with respect to the item has been accepted through the operation unit, control is performed to display, on the map image, one or more images among the plurality of images corresponding to the item which has accepted the predetermined operation, based on a relationship between (a) a direction based on a first operation position and a second operation position of the predetermined operation and (b) direction information associated with the plurality of images, wherein, in a case where the first operation position is not included in a region corresponding to the item, the control is not performed to display the one or more images on the map image and changes a display range of the map image, wherein the operation unit is a touchscreen installed in the display unit, and wherein the predetermined operation is a drag operation.

* * * * *